(12) United States Patent
Phillips

(10) Patent No.: US 8,865,812 B2
(45) Date of Patent: Oct. 21, 2014

(54) SEALANT AND FASTENER INCLUDING SAME

(71) Applicant: Brian J. Phillips, Lake Orion, MI (US)

(72) Inventor: Brian J. Phillips, Lake Orion, MI (US)

(73) Assignee: ND Industries, Inc., Clawson, MI (US)

( * ) Notice: Subject to any disclaimer, the term of this patent is extended or adjusted under 35 U.S.C. 154(b) by 0 days.

(21) Appl. No.: 13/897,931

(22) Filed: May 20, 2013

(65) Prior Publication Data

US 2013/0309040 A1    Nov. 21, 2013

Related U.S. Application Data

(60) Provisional application No. 61/649,180, filed on May 18, 2012.

(51) Int. Cl.
| | |
|---|---|
| *C08L 33/08* | (2006.01) |
| *F16B 33/04* | (2006.01) |
| *F16B 39/22* | (2006.01) |
| *C09J 123/08* | (2006.01) |
| *F16B 33/00* | (2006.01) |

(52) U.S. Cl.
CPC ............... *C08L 33/08* (2013.01); *F16B 33/004* (2013.01); *F16B 39/225* (2013.01); *C08L 2312/00* (2013.01); *C09J 123/0869* (2013.01)
USPC ............... 524/356; 524/533; 522/33; 522/39; 522/40; 522/64; 411/82

(58) Field of Classification Search
CPC ......... C08L 33/08; F16B 39/225; F16B 33/04
USPC .................. 524/533, 356; 522/33, 39, 40, 64; 411/82
See application file for complete search history.

(56) References Cited

FOREIGN PATENT DOCUMENTS

| | | | |
|---|---|---|---|
| JP | 2007161869 A | * | 6/2007 |
| WO | 9519392 | | 7/1995 |
| WO | 2007064366 | | 6/2007 |
| WO | 2009137197 | | 11/2009 |
| WO | WO 2009137197 A2 | * | 11/2009 |
| WO | 2012061498 | | 5/2012 |
| WO | WO-2012061498 A2 | * | 5/2012 |

OTHER PUBLICATIONS

International Search Report and Written Opinion for PCT/US2013/041822 dated Jul. 29, 2013.

* cited by examiner

*Primary Examiner* — Michael M Bernshteyn
(74) *Attorney, Agent, or Firm* — Warner Norcross & Judd LLP

(57) ABSTRACT

A liquid sealant composition that can be cured by photoinitiation, heat-activated free radical initiation or both that includes an effective amount of an elastomeric acrylic polyolefin; an effective amount of a low molecular weight acrylic functional monomer component, the acrylic functional monomer component containing one or more unreacted acrylic or methacrylic double bonds, the low molecular weight acrylic functional monomer component having greater than 75% monofunctional monomers, wherein the elastomeric acrylic polyolefin is soluble in the low molecular weight acrylic functional monomer; at least one plasticizer; and at least one curing agent, the curing agent including at least one photoinitiator, at least one heat-activated free radical initiator, or a combination of at least one photoinitiator and at least one heat-activated free radical initiator.

18 Claims, No Drawings

SEALANT AND FASTENER INCLUDING SAME

This application claims priority to U.S. Provisional Patent Application No. 61/649,180, filed May 18, 2012 and incorporates the disclosure of U.S. Provisional Patent Application No. 61/800,870 filed Mar. 15, 2013, by reference.

BACKGROUND

The present invention pertains to a sealant composition. More particularly, the present invention is directed to a sealant composition that is fluid in its uncured state and can be cured by processes such as UV, heat, or combinations of both. Finally the present invention is directed to a sealant for application to the underside flange of a headed fastener for the purpose of sealing as well as to fasteners so configured.

Various types of fastening applications require effective sealing interface between surfaces of the fastener and the associated substrate body. In headed fasteners, many assemblies require fluid tight seals between the head or flange and the corresponding surface. Initially, various independent seal members have been employed for this purpose. The need for speed and accuracy in assembly processes encouraged fasteners with sealant materials that has been integrated on to the associated fastener members prior to assembly. In such configurations, sealant material proximate to the underside or flange of the fastener is compressed between the underside or flange and a second surface to seal against The need for effective sealant formulations and for fastener-sealant combinations as well as effective sealant materials still continues.

In order to accomplish effective sealing, the sealant material employed should have sufficient conformational stability and compressiblilty. Many of the sealant materials employed incorporate curable polymeric materials that required processing under high temperature and/or high pressure for extended intervals in order to attain desired properties.

Ethylene acrylic elastomers (also referred to by their ISO1629 code as AEM Rubber) are currently used in the field for their heat and fluid resistant properties. These AEM materials in the raw form are solid and rubber like which can be extruded or injection molded to predetermined shapes, sizes and configurations and then cured by vulcanization. Formation of these structures requires processing at high temperatures and pressures for substantial lengths of time. Various types of structures for automotive applications such as radiator hoses, gaskets and seals can be made by these materials and processes. By compound blending AEM with its complimenting curing agent and a host of modifiers various properties can be obtained such as hardness, elongation, fluid resistance, and compression set. The AEM materials currently employed are unable to provide sealant properties when processed at lower temperatures and/or pressures and/or with shorter vulcanization times to create elements for gasketing or sealing.

It would be desirable to provide a sealant material for the underside or flange of a headed fastener that is subject to at least partial cure at ambient or lower temperatures as well as a fastener that includes the same. It would also be desirable to provide sealant materials that are flowable prior to curing that will provide a seal material that is resistant to elevated temperatures and various fluids throughout the lifetime of the fastener and associated product.

SUMMARY

A sealant suitable for use on devices such as the underside or flange of a headed fastener as well as a fastener and sealant combination is disclosed herein. The sealant can be applied in a liquid form and cured by processes such as heat, UV or using a dual stage curing process utilizing one or both of these processes. The dual stage curing process includes as initial rapid cure phase to establish and maintain the shape of the sealing element followed by a slower heat activated cure that completes the cross-linking of the sealant to provide a tough yet pliable sealing material.

The sealant material that is applied to the fastener includes an effective amount of an elastomeric component such as an acrylic polyolefin and an effective amount of an acrylic functional monomer together with a plasticizer component as well as a photo initiator and a heat activated free radical generator. The material is flowable when applied and is free of aqueous or organic solvent material. The sealant material can have a viscosity between 1000 cps and 100,000 cps. In certain embodiments, it is envisioned that the sealant material can have a viscosity between 1000 cps and 10,000 cps as applied. In other embodiments, it is envisioned that the viscosity of the sealant material may be between 10,000 cps to 100,000 cps.

Also disclosed is a fastener that includes a body having a first end and an opposed second end and a flange or head contiguously connected to either the first or second end of the body. The flange or head has an outer surface distal to the body and an opposed surface proximate to the body. The fastener having a polymeric layer overlying at least a portion of the surface of the flange proximate to the body. The polymeric layer is composed of a sealant material that includes effective amounts of an acrylic polyolefin elastomer and an acrylic functional monomer in combination with a plasticizer component. When in place on the flange, the sealant composition also includes suitable curing agents including photo initiators and/or heat-activated free radical generators. The applied sealant may be characterized by photoinitiated cross linkages, heat activated free radical cross linkages or a combination of both. The sealant material is resistant to exposure to fluids and heat.

DETAILED DESCRIPTION

Disclosed herein is a sealant composition that is flowable as applied and can be configured to undergo a dual cure process to yield a flexible dimensionally stable seal, particularly when applied to underhead regions of the flange or underhead region of an associated fastener that retains its shape though prolonged duty cycle. The resulting seal material, upon curing, resists material and/or performance degradation during the operation of the associated device particular when exposure to oils, various automotive fluids and heat. Prior to curing, the sealant composition is a flowable liquid material that can assume the shape of the substrate to which it is applied.

The sealant composition disclosed herein includes an effective amount of an elastomeric component such as an acrylic polyolefin solubilized in an effective amount of a low molecular weight acrylic functional monomer together with a plasticizer component. The sealant composition also includes at least one curing agent. The curing agent includes at least one a photo initiator, at least one heat activated free radical generator, or a combination of at least one photoinitiator and at least one heat-activated free radical initiator. The sealant composition material is flowable when applied and is free of aqueous or organic solvent material. The sealant material has a viscosity between 1000 cps and 100,000 cps or more as applied. In certain embodiments, it is envisioned that the viscosity of the sealant material can be between about 1000 cps to about 10,000 cps. In other embodiments, the sealant material can have a viscosity between about 10,000 cps to about 100,000 cps. Without being bound to any theory, it is believed that sealant materials having a lower viscosities such as those between 1000 cps about 10,000 cps are more amenable to application methods such as flow coating or being squirted on the desired parts while materials having higher viscosity values such as those between 10,000 cps to about 100,000 cps or more are materials that can be printed onto the associated part such as by printing on the associated surface; usually on the shaft or threads.

The acrylic polyolefin component employed can be a suitable alkylene acrylate elastomer. The amount of acrylic polyolefin employed can be governed by factors such as the viscosity of the material and/or the fluid resistance of the finished material. In various embodiments, the lower level of the acrylic polymer can be approximately 5% by weight with the upper amount being determined by viscosity and/or fluid resistance factors. In certain embodiments, the acrylic polyolefin can be alkylene acrylate and is employed in an amount between 5% by weight and 20% by total composition weight. Suitable alkylene acrylate elastomers can include, but are not limited to, ethylene acrylic elastomers which are also referred to as AEM Rubber (ISO1629). The elastomeric component of the sealing composition as disclosed herein can be a dipolymeric or terpolymeric elastomer with the alkylene constituent being a C-1 to C-4 alkylene such as methylene, ethylene or propylene constituent. In various embodiments, the acrylic polyolefin component can be an ethylene acrylic dipolymer or terpolymer or mixtures thereof.

The elastomeric component can be present in a effective amount in the resulting sealant composition. In certain embodiments, the sealant material includes from about 5% by weight (5 wt %) to about 20% by weight (20 wt %) of an ethylene acrylic dipolymer or terpolymer elastomer. Non-limiting examples of suitable polymeric component include elastomer products are sold by DuPont™ under the tradename Vamac®. In certain embodiments, terpolymeric grades containing a cure site monomer are utilized. One suitable elastomeric material is Vamac® G with a cure site monomer that is vulcanized with an amine based vulcanization system.

When grades with a cure site monomer are utilized, an amine-based vulcanization agent can be included in the sealant composition at a level from about 0.1% by weight (0.1 wt %) to about 5% by weight (5 wt %). Suitable amine-based vulcanization agents include multifunctional amine derivatives of carbamic acids. A non-limiting example of an effective vulcanizing agent for use with the Vamac® terpolymer elastomers is hexamethylenediamine carbamate (Diak™ No. 1).

To accelerate the vulcanization reaction, an accelerator may also be incorporated at an effective level such as from about 0.1% by weight (0.1 wt %) to about 5% by weight (5 wt %). Preferred accelerators are modified guanidines including di-ortho-tolylquanidine (DOTG) or diphenyl guanidine (DPG).

The sealant composition, in its initial flowable state also contains an amount of acrylic functional monomer sufficient to solubilize the associated elastomeric acrylic polyolefin. In various particular embodiments, the acrylic functional monomer is initially present in the sealant composition in an amount between about 50 to 80 parts by weight of an acrylic functional monomer or monomer blend. "Acrylic functional monomer" as that term is used herein is a low molecular weight component containing one or more unreacted acrylic or methacrylic double bonds. Molecular weights between 70 and 1000 are contemplated in certain embodiments. If a blend of acrylic functional monomers is used, the acrylic functional monomeric blend will contain consist predominantly, >75 wt %, of monofunctional monomer or monomers meaning that the monofunctional monomers contain only one unreacted acrylic double bond. The remaining acrylic functional monomers that are part of the blend will be difunctional, trifunctional or higher. The remaining acrylic functional monomeric component typically can contain three or more acrylic double bonds or can be blends of monomers with different functionalities. In various specific embodiments, monofunctional monomers include, but are not limited to, tetrahydrofurfuryl acrylate, tetrahydrofurfuryl methacrylate, 2-phenoxylethyl acrylate, 2-phenoxylethyl methacrylate and cyclic trimethylolpropane formal acrylate. A particularly preferred monofunctional monomer is isobornyl acrylate (iboa). It is also contemplated that acrylic oligomers may be employed in whole or in part in the material disclosed herein. Non-limiting examples of such materials include materials commercially available under the trade name Sartomer. It is believed that such materials include urethane acrylates or methacrylates, epoxy acrylates or methacrylates, silicone acrylates and the like. Acrylic functional monomers are particularly preferred when a UV curing step is to be employed.

Difunctional monomers employed in the sealant composition can include, but are not limited to, materials such as butanediol diacrylate, hexanediol diacrylate or diacrylate dimethacrylate, hexanediol dimethacrylate, diethylene glycol diacrylates, triethylene glycol diacrylates, polyethylene glycol diacrylates, diethylene glycol methacrylates, triethylene glycol methacrylates, polyethylene glycol methacryaltes, dipropylene glycol diacrylates, tripropylene glycol diacrylates, polypropylene glycol diacrylates, dipropylene glycol methacrylates, tripropylene glycol methacrylates, polypropylene glycol methacrylates. Multifunctional monomers include, but are not limited to, materials such as trimethylolpropane triacrylate, trimethylolpropane trimethacrylate, pentaerythritol tetraacrylate, dipentaerythritol pentaactrylate. A preferred difunctional monomer is a trialkylene glycol diacrylate such as triethylene glycol diacrylate.

A plasticizer is also present in the fluid sealant composition in an amount from about 2 parts by weight to about 25 parts by weight of the total composition. A single plasticizer may be used or a blend of two or more plasticizers may be included. The plasticizer level and type of material may be selected in order to control the viscosity of the liquid sealant composition. The plasiticizer can also be employed to control the hardness and pliability of the cured sealant material. Plasticizers typically employed in the sealant composition disclosed herein are those that exhibit low volatility. Preferred plasticizers include various ether/ester type plasticizers such as Thiokol TP 759 available from Dow Chemical, polyethylene glycol esters such as those available under the tradename Tegmer 809 from HallStar Corporation as well as various resin modifiers such as Cardolite LITE 2020 available from Cardolite Corporation. Without being bound to any theory, it is believed that resin modifiers such as Cardolite LITE 2020 is an unsaturated long-chain ether alcohol.

The liquid sealant composition also includes an effective amount at least one curing agent. The curing agent will be one that effects cross linking of the available cure sites on either the elastomeric acrylic polyolefin, the low molecular weight acrylic functional monomer or both. In specific embodiments, the curing agent will be a compound or blend of compounds that will facilitate cross linkage under desired conditions. In certain embodiments, the cross-linking agent will be one that facilitates a rapid cross linking reaction to achieve surface cure by UV and/or cationic photoinitiation triggered by exposure to ultraviolet or near-ultraviolet radiation. This rapid cross-linking stage can be followed by or substituted with a heat-activated curing process as desired or required. Where heat-activated curing is desired, the liquid sealant composition can include at least one heat-activated free radical initiator.

If a dual-cure process is desired, the liquid sealant composition disclosed herein the curing agent can include at least one photoinitiator and at least one heat-activated free radical initiator. The curing agent will be present in an amount sufficient to accomplish the desired level of cure in the desired interval.

The photoinitiator(s) of choice will be one that can accomplish at least a partial cure sufficient to provide structural stability to the sealant material applied to an associated fastener. The photoinitiator selection will be done so as the absorption spectrum of the photoinitiator matches the output spectrum of the UV radiation source. As the purpose of the photo curing step is to quickly set the shape of the sealant, UV photoinitiators which promote a rapid surface cure are preferred. The ultraviolet photoinitiator can be one that is soluble in organic liquids such as the low molecular weight acrylic functional monomeric compound. The material can be present in a liquid state. Non-limiting examples of suitable material include α-hydroxyketones, phenylglyoxylates, benzyldimethyl-ketals, α-aminoketones, mono acyl phospine oxides and bis acyl phosphine oxides or blends of two or more of the above.

The UV photoinitiator can be present from about 0.1% by weight (0.1 wt %) to about 5% by weight (5 wt %) of the total sealant composition. A preferred UV photoinitiator is Darocur 4265 available from BASF. For compositions designed not to be post-cured, a preferred photoinitiator is Irgacure 2022, also available from BASF. It is believed that Darocur 4265 is a free radical photointitiator that is a 50:50 blend of 2,4,6-trimethyl-benzoyldiphenylphosphine oxide (TPO) and 2-hydroxy-2-methyl-1-phenyl propan-1-one. Irgacure 2022 is believed to contain phenylbis (2,4,6-trimethylbenzoyl)-phosphineoxide (BAPO) in admixture with one or more components.

It is also considered within the purview of this disclosure to employ a cationic photoinitiator(s) in the place of some or all of the UV photoinitiator component(s). Non-limiting examples of suitable materials include various aryl sulfonium or iodium salts materials such as Irgacure 250 and Esacure. It is believed that Irgacure 250 is iodonium (4-methylphenyl) [4-(2-methylpropyl)phenyl]-hexafluorophosphate(1-)) in a solution of propylene carbonate. Esacure are proprietary cationic photoinitiators commercially available from Lamberti USA.

The sealant composition as disclosed herein can also include a suitable heat-activated free radical generator that is capable of providing extended or extensive cross linking to provide a flexible resilient cross-linked polymeric sealant material. The heat-activated free radical generator can be present in an amount sufficient to accomplish cross linking. In many embodiments, the heat-activated free radical generator is present in an amount between about 0.1% by weight (0.1 wt %) to about 5% by weight (5 wt %).

The heat-activated free radical generator may be a material capable of producing sufficient free radicals to initiate and sustain the associated free radical cross-linking reaction to complete the cure of the associated sealant composition. It is contemplated that the free radical generator can be selected from the group consisting of organic peroxides, organic hydroperoxides and mixtures thereof. Organic peroxides suitable for use in the sealant composition disclosed herein include, but are not limited to, dicumyl peroxide, 2,5-dimethyl-2,5-di(t-butylperoxy) hexyne-3, n-butyl 4,4-di(t-butylperoxy) valerate, 2,5-dimethyl-2,5-di(t-butylperoxy)hexane, and 1,1-bis(t-butylperoxy)-3,3,5-trimethylcyclohexane. Organic hydoperoxides suitable for using in the present invention include but are not limited to cumene hydroperoxide or tert-butyl hydroperoxide. One peroxide compound suitable for completing the cure of the sealant material is di-tert-butyl peroxide.

Where the sealant composition is configured for dual curing capability, the composition will include both photoinitiator and heat activator free radical generator. The relative amounts or ratio of photoinitiator to free radical generator will be that sufficient to quickly accomplish soft cure followed by complete cure. It is also within the purview of this disclosure that the curing agent in the sealant composition be composed completely of photoinitiator(s). In such situations, the cure can be accomplished by exposure to UV, near UV or the like. Similarly, the sealant composition can be configured in which the curing agent is solely or primarily heat-activated free radical generator. In certain embodiments, when a terpolymer is employed, it is contemplated that the material can include two or more different curatives and curing mechanisms. In such situations materials such as DIAK 1 reacts with carboxyl sites on the elastomer and the peroxide completes the reaction any unreacted acrylate or methacrylate functional materials that were unreacted during the UV cure.

The liquid sealant composition may also contain one or more optional ingredients including but not limited to antioxidants, fillers, pigments, dyes, adhesion promoters, accelerators and the like. The optional ingredients, if present, will be present in effective amounts in the composition but amounts which do not impede function of the liquid sealant composition of the resulting sealant material. It is contemplated that these optional additives will cumulatively constitute between about 0.01% by weight (0.01 wt %) to about 5% by weight (5 wt %) of the total composition weight.

The individual components present in the liquid sealant composition can be compounded in any suitable manner. The various components of the sealant composition are admixed in a liquefied state that is free or essentially free of aqueous or organic solvent. The resulting sealant composition will exist as a liquid at standard temperature and pressure and has a viscosity that permits and application to the under surface of the fastener head. The liquid sealant composition will be compounded to have specific viscosity to permit the ready application of the material to the associated fastener. The viscosity of the liquid sealant composition prior to any cure may be between about 1000 cps and about 100,000cps or higher. In certain embodiments, it is envisioned that the viscosity of the sealant material can be between about 1000 cps to about 10,000 cps. In other embodiments, the sealant material can have a viscosity between about 10,000 cps to about 100,000 cps. Without being bound to any theory, it is believed that sealant materials having a lower viscosities such as those between 1000 cps about 10,000 cps are more amenable to application methods such as flow coating or being squirted on the desired parts while materials having higher viscosity values such as those between 10,000 cps to about 100,000 cps or more are materials that can be printed onto the associated part such as by printing on the associated surface; usually on the shaft or threads.

The applied liquid sealant material is one that will undergo at least partial cure when exposed to radiation in the UV or near UV region. It is understood that the specific wavelength that is employed can vary depending upon the specific photoinitiator employed. Without being bound to any theory, it is believed that the level of cross linkage will be a level sufficient to lock the applied material in a given dimension. The partially cured sealant material can then be exposed to elevated temperature to complete vulcanization of the compounds which results in a finished gasket or seal material. The resulting sealant material is a polymeric material that is resistant to oils and heat based on the final operations parameters. An example of such resistance is dimensional stability 1500 hrs at 150° C. in automatic transmission fluid (ATF) after which the material remains flexible and retains its shape and dimensions. The resulting sealant material can meet or exceed various other comparable performance specifications.

In order to further illustrate the invention outlined in this disclosure, the following Examples have been provided. The Examples are to be considered illustrative and not limitative of the invention set forth in the associated claims.

EXAMPLE I

In order to ascertain the effectiveness of a material subjected to dual cure operations, 12.80 Parts Vamac G terpolymer are added to 66.65 pars isobornyl acrylate and 2.93 parts Sartomer 272 and mixed at standard temperature and pressure until dissolved. To this solution the following components are added: 0.62 parts di-ortho-tolylquanidine (DOTG), 0.15 parts hexamethylenediamine carbamatem, 10.18 parts Thiokol TP-759, 4.63 parts Cardolite 2020, 0.31 parts antioxidant 12, 0.85 parts t-butyl peroxide and 0.85 parts Darocur 4265 and 0.03 parts Morplas Blue pigment.

The resulting composition is a liquid that has a viscosity of about 3920 cps. The material is applied to metal substrate samples at depths of 0.5 mm, 1.0 mm and 3.0 mm respectively. Each assembly is subjected to ultra violet radiation. The resulting material has a depth of cure of 15 at 10 fpm and 300 WPI. Post-curing at 135 ° C. for 10 min produced a solid material at a thickness up to 1 mm or thicker that adheres to the substrate and exhibits both flexibility and compressibility.

EXAMPLE II

In order to ascertain the effectiveness of compositions prepared according to the present disclosure, 14.91 Parts Vamac DP dipolymer are added to 77.65 pars isobornyl acrylate and 3.41 parts Sartomer 272 and mixed until dissolved. To this solution are added 3 parts Irgacure 202 and 0.03 parts Morplas Blue pigment. The resulting material is placed on a substrate at a thickness of 3.0 millimeters. The material is subjected to UV radiation. The material has a depth of cure of at least __1 and 10 fpm and 300 WPI. The resulting sealant material is a solid material having a thickness of up to 1 mm that adheres to the associated substrate exhibiting flexibility and compressibility.

EXAMPLE III

In order to ascertain the performance of material prepared according to the disclosure outlined in the present disclosure, 12.93 Parts Vamac G terpolymer are added to 67.34 parts isobornyl acrylate and 2.96 parts Sartomer 272 and mixed until dissolved. To this solution 0.62 parts di-ortho-tolylquanidine (DOTG), 0.15 parts hexamethylenediamine carbamatem, 10.18 parts Thiokol TP-759, 4.63 parts Cardolite 2020, 0.31 parts antioxidant 12, 0.85 parts t-butyl and 0.03 parts Morplas Blue pigment are added. The resulting material is a liquid have a viscosity of approximately 4000 cps. The material is placed on metal substrate samples at a thickness of 0.5 millimeters, 1.0 millimeters, and 3.0 millimeters, respectively. Each are heated to a temperature of 135 degrees C. or an interval of 10 minute . The resulting sealant material is a solid material with a thickness of up to 1 mm that adheres to the associated substrate exhibiting flexibility and compressibility.

Also disclosed herein is a fastening member that is composed of an elongated body having a first end and an opposed second end with a head of flange contiguously joined to either the first end or the opposed second end. The head has an outwardly facing surface distal from the elongated body and an under head surface that is generally opposed to the outwardly facing surface and protects angularly outward from the elongated body. The sealant material as disclosed herein is in overlying relationship with at least a portion of the under head surface.

The liquid sealant composition can be applied to selected region on the fastener by any suitable method to the desired thickness and contour. The sealant material as applied is a liquid having a viscosity suitable to conform to any contours present in the selected fastener region such as the under head or flange region but capable of maintaining the applied liquid material in location during processing and manufacture. The desired viscosity of the liquid sealant composition will be in the range from about 1000 cps to about 100,000 cps or above The liquid sealant composition applied can be one that is capable of partial cure upon exposure to suitable UV or near UV radiation. It is contemplated that the applied liquid sealant material undergoes partial cure when exposed UV radiation to lock it in the given dimension. The partially cured sealant material can then exposed to heat to complete vulcanization of the compounds resulting in a finished gasket or seal. The resulting cured sealant material comprises a polymeric compound that is resistant to oils and heat based on the final operations parameters; an example is 1500 hrs at 150° C. in automatic transmission fluid (ATF) and still be flexible and retain its shape and dimension.

The liquid sealant material on application may comprise an effective amount of an acrylic polyolefin, typically greater than about 5% by weight (5 wt %); between about 50% by weight (50 wt %) to 80% by weight (80 wt %) of an acrylic functional monomer; between about 2% by weight (2 wt %) to about 25% by weight (25 wt %) of a plasticizer; between about 0.1% by weight (0.1 wt %) to about 5% by weight (5 wt %) of a ultraviolet activated photoinitiator; and between about 0.1% by weight (0.1 wt %) to about 5% by weight (5 wt %) of a heat activated free radical generator such as a heat activated peroxide.

Optionally, the liquid sealant material as applied may also contain minor amounts, for example from about 0.01% by weight (0.01 wt %) to about 5% by weight (5 wt %) of other additives including at least one of vulcanizing agents, antioxidants, fillers, pigments, dyes, adhesion promoters, accelerators and the like.

Partial and final cure steps can be accomplished at any suitable stage in the fastener manufacturing process. It is also possible that final stages of cure and cross linking can occur after the fastener is in position in the associated assembly. In certain situations, at the minimum, initial cure can occur at a time and location either proximate to or remote from application of the liquid sealant composition. Similarly any subsequent heat curing process required can occur at a time and location proximate to or remote from the initial curing step. Thus the liquid sealant composition disclosed herein can be utilized in a variety of manufacturing and assembly processes.

It is to be understood that the partially cured sealant material will have a composition based on the precursors mentioned previously.

The fastener member disclosed herein can include sealant composition in liquid state or in any state of cure or cross linking. Thus the fastener can have a sealant material overlying at least a portion of the under head region of the head or flange in any stage from uncured to fully cured; that is fluid though to dimensionally stable and on to fully cross linked.

Thus as broadly described, the fastener will have an elongated body with as first end and an opposed second end. A head or flange member will be contiguously connected to the either the first or the second end of the elongated body and define an underhead surface on the head or flange member proximate to the elongated body. A sealant composition based is present in overlying relationship to at least a portion of the underhead surface in either liquid, partially cured or fully cured condition. The sealant composition in liquid from comprises between about 5% by weight (5 wt %) to about 20% by weight (20 wt %) of an acrylic polyolefin copolymer such as an ethylene acrylic dipolymer or terpolymer elastomer; between about 50% by weight (50 wt %) to 80% by weight (80 wt %) of an acrylic functional monomer; between about 2% by weight (2 wt %) to about 25% by weight (25 wt %) of a plasticizer; between about 0.1% by weight (0.1 wt %) to about 5% by weight (5 wt %) of a ultraviolet activated photoinitiator; and between about 0.1% by weight (0.1 wt %) to about 5% by weight (5 wt %) of a heat activated free radical generator such as a heat activated peroxide. It is to be understood that, in the partially cured or fully cured state, the sealant material will have a chemical structure that is based upon the cross-linking polymerization of the components mentioned.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sealant composition comprising:
   an elastomeric acrylic polyolefin is present in an amount between 5% by weight and 20% by weight based on the total weight of the composition;
   a low molecular weight acrylic functional monomer component is present in an amount between 50% by weight and 80% by weight based on the total weight of the composition to solubilize the elastomeric acrylic polyolefin, the acrylic functional monomer component containing one or more unreacted acrylic or methacrylic double bonds, the low molecular weight acrylic functional monomer component comprising greater than 75% monofunctional monomers;
   at least one plasticizer; and
   at least one curing agent, the curing agent including at least one photoinitiator, at least one heat-activated free radical initiator, or a combination of at least one photoinitiator and at least one heat-activated free radical initiator.

2. The sealant composition of claim 1 wherein the composition is in one of a liquid phase, partially cross-linked dimensionally stable phase, or fully cross-linked solid phase, wherein the composition in the fully cross-linked solid phase provides a flexible seal between at least one fastener and an associated substrate.

3. The sealant composition of claim 1 wherein the elastomeric acrylic polyolefin is selected from the group consisting of an alkylene acrylate dipolymeric elastomer, an alkylene acrylate terpolymeric elastomer, and combinations thereof, wherein the alkylene constituent is a C-1 to C-4 alkylene, and wherein the elastomeric polyolefin is present in the composition in an amount greater than 5% by weight of the composition.

4. The sealant composition of claim 3 wherein the elastomeric acrylic polyolefin has at least one cure site monomer that is vulcanized with an amine-based vulcanization system, the sealant composition further comprising an amine based vulcanization agent present in an amount between 0.1% by weight and 5.0% by weight of the total composition.

5. The sealant composition of claim 4 further comprising a vulcanization accelerator, the accelerator present in an amount between 0.1% by weight and 5.0% by weight.

6. The sealant composition of claim 1 wherein the monofunctional monomer present in the low molecular weight acrylic functional monomer component is selected from the group consisting of tetrahydrofurfuryl acrylate, tetrahydrofurfuryl methacrylate, 2-phenoxyethyl acrylate, 2-phenoxylethyl methacrylate, cyclic trimethylolpropane formal acrylate, isobornyl acrylate, and combinations thereof.

7. The sealant composition of claim 6 wherein the acrylic functional monomer component further contains difunctional and/or multifunctional monomers that contain three or more acrylic bonds, wherein the difunctional monomers are selected from the group consisting of butanediol diacrylate, hexanediol diacrylate, butanediol dimethacrylate, hexanediol dimethacrylate, diethylene glycol diacrylates, triethylene glycol diacrylates, polyethylene glycol diacrylates, diethylene glycol methacrylates, triethylene glycol methacrylates, polyethylene glycol methacrylates, and combinations thereof; and wherein the multifunctional monomers are selected from the group consisting of trimethylolpropane triacrylate, trimethylolpropane trimethacrylate, pentaerythritol tetraacrylate, dipentaerythritol pentaacrylate, and combinations thereof.

8. The sealant compostion of claim 7 wherein the acrylic functional monomer is a trialkylene glycol diacrylate.

9. The sealant composition of claim 1 wherein the plasiticizer is present in an amount between 0.1% by weight and 5% by weight of the total composition.

10. The sealant composition of claim 1 wherein the ultraviolet photoinitiator is selected from the group consisting of α-hydroxyketones, phenylglyoxylates, benzyldimethyl-ketals, α-aminoketones, mono acyl phospine oxides, bis acyl phosphine oxides, and combinations thereof.

11. The sealant composition of claim 1 wherein the heat-activated free radical generator is present in an amount between 0.1% by weight and 5% by weight, the free radical generator being selected from the group of an organic peroxide, an organic hydroperoxide, and combinations thereof.

12. The sealant composition of claim 11 wherein the heat-activated free radical generator is selected from the group consisting of dicumyl peroxide, 2,5-dimethyl-2,5-di(t-butylperoxy) hexyne-3, n-butyl 4,4-di(t-butylperoxy) valerate, 2,5-dimethyl-2,5-di(t-butylperoxy)hexane, 1,1-bis(t-butylperoxy)-3,3,5-trimethylcyclohexane, cumene hydroperoxide, tert-butyl hydroperoxide, and combinations thereof.

13. The sealant composition of claim 1 wherein the composition is a liquid having a viscosity between 1000 and 15,000 cps.

14. The sealant composition of claim 13 wherein the material is present as the cross-linked reaction product of the elastomeric acrylic polyolefin and the low molecular weight acrylic functional monomer.

15. The sealant composition of claim 1 further comprising at least one additive present in an amount between 0.1% by weight and 5.0% by weight, the additive being selected from the group consisting of vulcanizing agents, antioxidants, fillers, pigments, dyes, adhesion promoters, accelerators, and combinations thereof.

16. A fastener having an elongated body, a head having an underhead region proximate to the elongated body, the underhead region having a layer of the sealant composition of claim 1.

17. The fastener of claim 16 wherein the elongated body has a first end and an opposed second end with the head is a flange contiguously joined to either the first end or the opposed second end, the head having an outwardly facing surface distal from the elongated body and an under head surface that is generally opposed to the outwardly facing surface and protects angularly outward from the elongated body, the sealant composition being material applied in overlying relationship with at least a portion of the under head surface.

18. A sealant composition comprising:
an acrylic polyolefin dipolymeric or terpolymeric elastomer, present in an amount between 5% by weight and 20% by weight;
a low molecular weight acrylic functional monomer component present in an amount between 50% by weight and 80% by weight, the acrylic functional monomer component containing one or more unreacted acrylic or methacrylic double bonds, the low molecular weight acrylic functional monomer component comprising greater than 75% monofunctional monomers, wherein the acrylic polyolefin elastomer is soluble in the low molecular weight acrylic functional monomer;
at least one plasticizer, the plasticizer present in an mount between 2% by weight and 25% by weight; and
at least one curing agent, the curing agent including at least one photoinitiator, at least one heat-activated free radical initiator, or a combination of at least one photoinitiator and at least one heat-activated free radical initiator.

* * * * *